United States Patent [19]

Shinohara et al.

[11] Patent Number: 4,831,364
[45] Date of Patent: May 16, 1989

[54] DRILLING MACHINE

[75] Inventors: Shigeru Shinohara, Mito; Shun Suzuki; Masateru Niyada, both of Katsuta, all of Japan

[73] Assignee: Hitachi Koki Company, Limited, Tokyo, Japan

[21] Appl. No.: 24,516

[22] Filed: Mar. 11, 1987

[30] Foreign Application Priority Data

Mar. 14, 1986 [JP] Japan .................................. 61-57988
Mar. 14, 1986 [JP] Japan .................................. 61-57989
Mar. 28, 1986 [JP] Japan .................................. 61-72005
Apr. 4, 1986 [JP] Japan .................................. 61-77810

[51] Int. Cl.$^4$ ........................................... G08B 21/00
[52] U.S. Cl. .................................... 340/680; 340/664; 408/9
[58] Field of Search ................. 340/680, 664, 648; 408/8-13; 318/450, 476; 361/23, 31, 87; 307/131; 324/71.1; 364/474

[56] References Cited

U.S. PATENT DOCUMENTS 4,338,556 7/1982 Hetzel .............................. 408/11 X
4,559,577 12/1985 Shoji et al. ..................... 340/680 X
4,581,711 4/1986 Hirata et al. .................... 340/664 X

FOREIGN PATENT DOCUMENTS 61-37450 10/1986 Japan .
2075875 11/1981 United Kingdom .

OTHER PUBLICATIONS

DE-Z, Fertigungstechnik und Betrieb, 1984, 11, pp. 681-683.
DE-Z, tz für Metallbearbeitung, 1984, 3, pp. 70-72.

Primary Examiner—Glen R. Swann, III
Assistant Examiner—Thomas J. Mullen, Jr.
Attorney, Agent, or Firm—Cushman, Darby & Cushman

[57] ABSTRACT

A drive motor connected to a drill bit serves to actuate the drill bit. An electric current is allowed to flow through the drive motor to activate the drive motor. A mechanism serves to feed the drill bit with respect to a workpiece. The current flowing through the drive motor is sensed. A device stores a value of the current which is sensed when the drill bit is out of engagement with the workpiece. A determination is made as to whether or not a drilling process is completed in accordance with a value of the present sensed current and the stored value of the sensed current.

13 Claims, 10 Drawing Sheets

DRILLING MACHINE

BACKGROUND OF THE INVENTION

1. Field of the Invention

This invention relates generally to an electric drill or drilling machine, and particularly to an electric drilling machine equipped with an electric control system.

2. Description of the Prior Art

Electric drilling machines include a drive motor for rotating a drill bit. In general, when the drilling process is completed, an electric current passing through the drive motor drops to a no-load level.

Japanese published unexamined utility model application No. 57-96719 corresponding to Japanese published examined utility model application 61-37450 discloses a processing stroke control system for a drill unit. This system includes a meter-type relay which senses a no-load electric current through a drive motor to detect the completion of the drilling process. The detection of the completion of the drilling process is used in the processing stroke control.

The no-load current through the drive motor depends on various factors, such as the voltage across the drive motor, the ambient temperature, and the mechanical loss. Furthermore, in the case where the rotational speed of the drive motor is adjusted in accordance with the diameter of the drill bit, the no-load current through the drive motor varies with the diameter of the drill bit. The Japanese utility model application 57-96719 fails to consider such variations in the no-load current through the drive motor.

SUMMARY OF THE INVENTION

It is an object of this invention to provide a reliable electric drilling machine.

In accordance with a first drilling machine of this invention, a drive motor connected to a drill bit serves to actuate the drill bit. An electric current is allowed to flow through the drive motor to activate the drive motor. A mechanism serves to feed the drill bit with respect to a workpiece. The current flowing through the drive motor is sensed. A device stores a value of the current which is sensed when the drill bit is out of engagement with the workpiece. A determination is made as to whether or not a drilling process is completed in accordance with a value of the present sensed current and the stored value of the sensed current.

In accordance with a second drilling machine of this invention, a drive motor connected to a drill bit serves to actuate the drill bit. An electric current is allowed to flow through the drive motor to activate the drive motor. A mechanism serves to feed the drill bit with respect to a workpiece. The current flowing through the drive motor is sensed. A completion of a drilling process is detected in accordance with the sensed current through the drive motor. Activation of the feeding mechanism is maintained for a preset time from a moment at which the completion of the drilling process is detected.

In accordance with a third drilling machine of this invention, a drive motor connected to a drill bit serves to actuate the drill bit. A mechanism serves to feed the drill bit with respect to a workpiece. A device serves to sense an overload of the drive motor. When the overload of the drive motor is sensed, the feeding mechanism is deactivated.

In accordance with a fourth drilling machine of this invention, a drive motor connected to a drill bit serves to actuate the drill bit. An electric current is allowed to flow through the drive motor to activate the drive motor. A mechanism serves to feed the drill bit with respect to a workpiece. The current flowing through the drive motor is sensed. A determination is made as to whether or not the sensed current through the drive motor becomes zero. When the sensed current becomes zero, the feeding mechanism is deactivated.

BRIEF DESCRIPTION OF THE DRAWINGS

Like and corresponding elements are denoted by the same reference characters throughout the drawings.

DESCRIPTION OF THE FIRST PREFERRED EMBODIMENT

Figure 1:
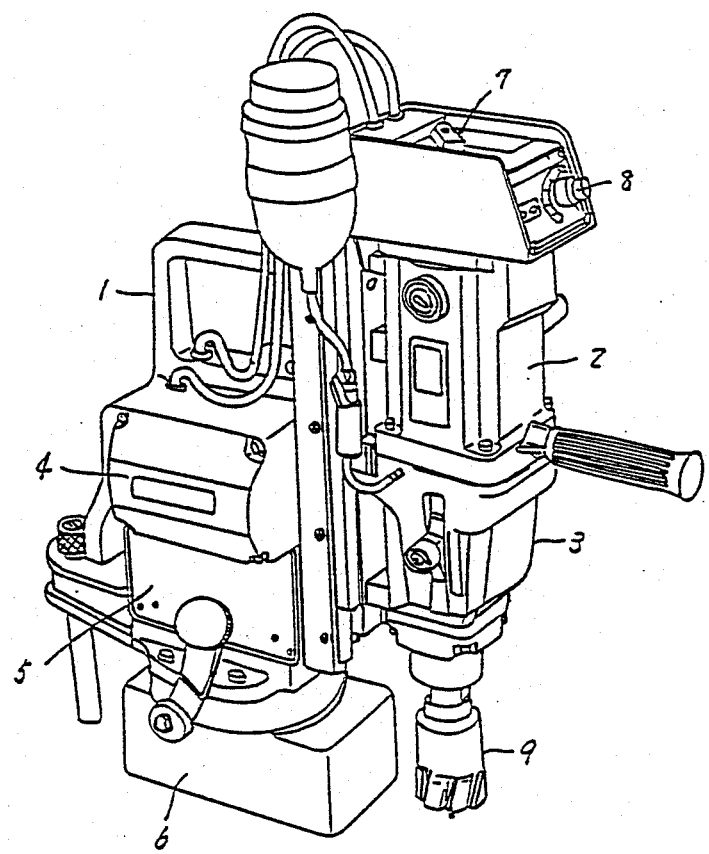
FIG. 1 is a perspective view of a drilling machine according to a first embodiment of this invention.

With reference to FIG. 1, a drilling machine is shown which includes a drill stand 1 and an electric drill unit 3 slideably mounted on the drill stand 1 via a conventional sliding mechanism. The drill unit 3 includes an electric drive motor 2, a main spindle, and a drill bit 9 or a combination of a chuck and a drill bit detachably mounted on a free end of the main spindle. The drive motor 2 serves to rotate the main spindle and the drill bit 9 together. An electric feed or sliding motor 4 is supported by the drill stand 1. The feed motor 4 is connected to the drill unit 3 via a conventional mechanism which allows the feed motor 4 to slide the drill unit 3 relative to the drill stand 1 in the direction along the main spindle.

In the embodiment of FIG. 1, the drill unit 3 can move vertically relative to the drill stand 1. When the feed motor 4 rotates in one direction, the drill unit 3 is lowered. When the feed motor 4 rotates in the opposite direction, the drill unit 3 is lifted.

A control box 5 supported by the drill stand 1 accommodates electric circuits controlling the drive motor 2 and the feed motor 4.

An electromagnetic base 6 connected to the drill stand 1 includes an electromagnet. When the electromagnet is energized, a workpiece of magnetic material is fixed to the base 6 by an electromagnetic attracting force.

A knob 7 mounted on the drill unit 3 is connected to switches described hereinafter. A knob 8 mounted on the drill unit 3 is connected to control arms of variable resistors described hereinafter.

Figure 2:
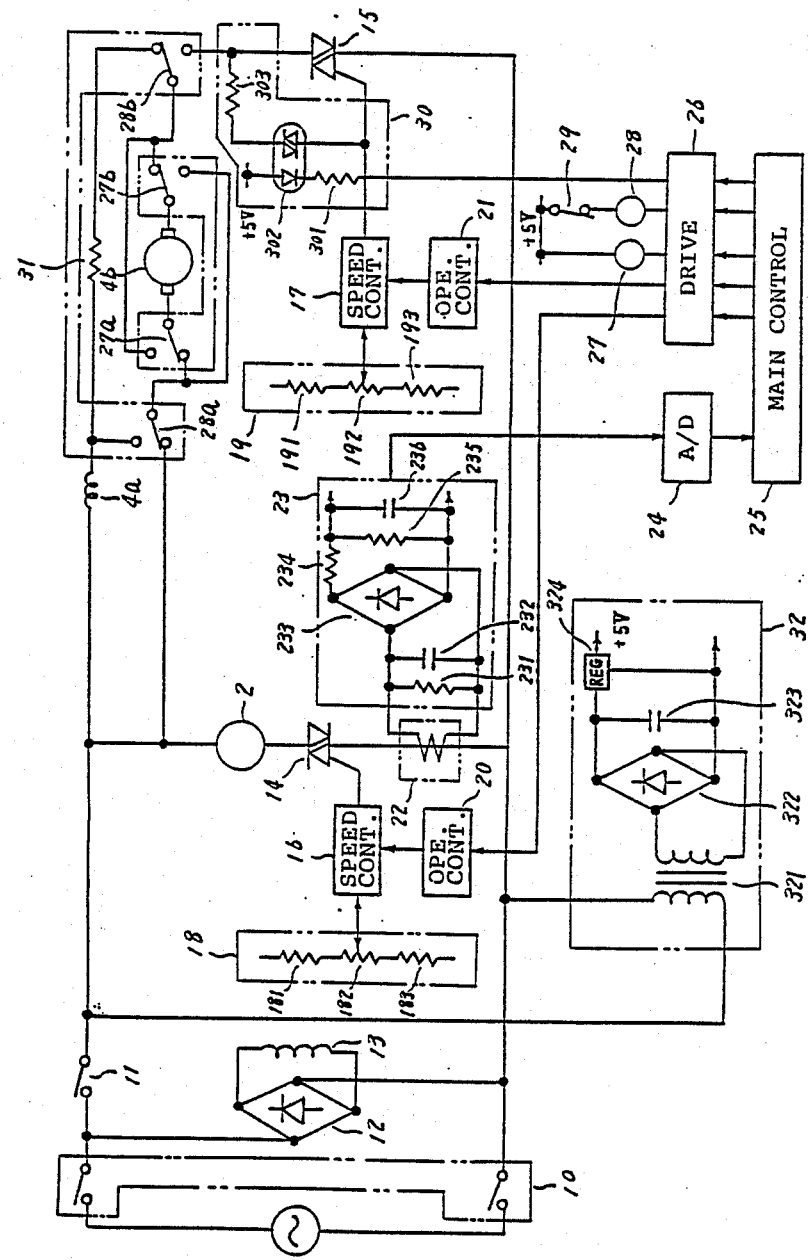
FIG. 2 is a diagram of an electric part of the drilling machine of FIG. 1.

As shown in FIG. 2, the drive motor 2 is electrically connected across an ac power supply (no reference character) via a double-throw type power supply switch 10, an automatic mode selection switch 11, a semiconductor control element 14 such as a Triac, and a current sensor 22 including a current transformer. The switches 10 and 11 are mechanically connected to the knob 7. The knob 7 is changeable among three positions. When the knob 7 assumes the first position, both the switches 10 and 11 are opened. When the knob 7 assumes the second position, the power supply switch 10 is closed but the automatic mode selection switch 11 is opened. When the knob 7 assumes the third position, both the switches 10 and 11 are closed so that the drive motor 2 can be supplied with electric power. The effective ac current, that is, the electric power, supplied to the drive motor 2 is adjustable via the Triac 14. The sensor 22 detects the current through the drive motor 2.

The feed motor 4 includes a field winding 4a and an armature winding 4b. One end of the field winding 4a is electrically connected to one terminal of the power supply via the power supply switch 10 and the automatic mode selection switch 11. The other end of the field winding 4a is electrically connected to a first fixed contact of a relay switch 28b via a fixed resistor 31. The fixed resistor 31 serves to brake the feed motor 4 when the supply of electric power to the feed motor 4 is suspended. A second fixed contact of the relay switch 28b is electrically connected to the other terminal of the power supply via a semiconductor control element 15 such as a Triac, and via the power supply switch 10. A movable contact of the relay switch 28b is electrically connected to a first fixed contact of a relay switch 27b and a second fixed contact of a relay switch 27a. The movable contact of the relay switch 28b is normally in contact with the first fixed contact of the relay switch 27b. A second fixed contact of the relay switch 27b is electrically connected to a first fixed contact of the relay switch 27a and a movable contact of a relay switch 28a. One end of the armature winding 4b is electrically connected to a movable contact of the relay switch 27b. The movable contact of the relay switch 27b is normally in contact with the first fixed contact of the relay switch 27b. The other end of the armature winding 4b is electrically connected to a movable contact of the relay switch 27a. The movable contact of the relay switch 27a is normally in contact with the first fixed contact of the relay switch 27a. A first fixed contact of the relay switch 28a is electrically connected to one terminal of the power supply via the power supply switch 10 and the automatic mode selection switch 11. A second fixed contact of the relay switch 28a is electrically connected to a junction between the field winding 4a and the fixed resistor 31.

As will be made clear hereinafter, the effective ac current, that is, the electric power, supplied to the feed motor 4 is adjustable via the Triac 15.

A rectifier bridge connection 12 is wired across the power supply via the power supply switch 10. The rectifier bridge connection 12 derives dc power from the ac power. An electromagnetic winding 13 of the electromagnet within the electromagnetic base 6 is connected to the rectifier bridge connection 12. When the power supply switch 10 is closed, the rectifier bridge connection 12 feeds dc power to the winding 13 so that the electromagnet within the electromagnetic base 6 is activated.

A speed control circuit 16 connected to a gate of the Triac 14 serves to adjust or regulate the rotational speed of the drive motor 2. The speed control circuit 16 outputs a signal to the gate of the Triac 14 which determines the conduction or firing angle of the Triac 14. Since the effective ac current passing through the drive motor 2 depends on the conduction or firing angle of the Triac 14, the effective ac current passing through the drive motor 2 also depends on the signal applied to the gate of the Triac 14 from the speed control circuit 16. Accordingly, the signal outputted to the gate of the Triac 14 from the speed control circuit 16 determines the rotational speed of the drive motor 2.

The speed control circuit 16 consists of a conventional open-loop type phase control circuit or a known closed-loop type constant speed control circuit. In the case of a closed-loop constant speed control circuit, the actual rotational speed of the drive motor 2 is detected by a speed sensor, and the drive motor 2 is controlled in accordance with the difference between the actual rotational speed and a setting rotational speed so that the actual rotational speed will follow or equal the setting rotational speed.

A rotational speed setting circuit 18 includes a fixed resistor 181, a variable resistor 182, and a fixed resistor 183 which are connected in series with a reference dc or ac voltage source such as a constant dc voltage source. The variable resistor 182 outputs a voltage signal which varies as a control shaft of the variable resistor 182 rotates. The control shaft of the variable resistor 182 is mechanically connected to the knob 8 so that the control arm moves with the knob 8. The voltage signal outputted by the variable resistor 182 represents a setting rotational speed of the drive motor 2 which is adjusted with the position of the knob 8. The variable resistor 182 is electrically connected to the speed control circuit 16 so that the setting rotational speed signal is applied to the speed control circuit 16. The rotational speed of the drive motor 2 is normally regulated, via the combination of the speed control circuit 16 and the Triac 14, at the setting speed represented by the signal fed from the speed setting circuit 18 to the speed control circuit 16.

An operation control circuit 20 connected to the speed control circuit 16 selectively activates and deactivates the speed control circuit 16 in accordance with a control signal applied to the operation control circuit 20.

A speed control circuit 17 connected to a gate of the Triac 15 serves to adjust or regulate the rotational speed of the feed motor 4. The speed control circuit 17 outputs a signal to the gate of the Triac 15 which determines the conduction or firing angle of the Triac 15. Since the effective ac current passing through the feed motor 4 depends on the conduction or firing angle of the Triac 15 as will be made clear hereinafter, the effective ac current passing through the feed motor 4 also depends on the signal applied to the gate of the Triac 15 from the speed control circuit 17. Accordingly, the signal outputted to the gate of the Triac 15 from the speed control circuit 17 determines the rotational speed of the feed motor 4.

The speed control circuit 17 consists of a conventional open-loop type phase control circuit or a known closed-loop type constant speed control circuit. In the case of a closed-loop constant speed control circuit, the actual rotational speed of the feed motor 4 is detected by a speed sensor, and the feed motor 4 is controlled in accordance with the difference between the actual rotational speed and a setting rotational speed so that the actual rotational speed will follow or equal the setting rotational speed.

A rotational speed setting circuit 19 includes a fixed resistor 191, a variable resistor 192, and a fixed resistor 193 which are connected in series with a reference dc or ac voltage source such as a constant dc voltage source. The variable resistor 192 outputs a voltage signal which varies as a control shaft of the variable resistor 192 rotates. The control shaft of the variable resistor 192 is mechanically connected to the knob 8 so that the control shaft moves with the knob 8. The voltage signal outputted by the variable resistor 192 represents a setting rotational speed of the feed motor 4 which is adjusted with the position of the knob 8. The variable resistor 192 is electrically connected to the speed control circuit 17 so that the setting rotational speed signal is applied to the speed control circuit 17. The rotational speed of the feed motor 4 is normally regulated, via the combination of the speed control circuit 17 and the Triac 15, at the setting speed represented by the signal fed from the speed setting circuit 19 to the speed control circuit 17.

The control shaft of the variable resistor 192 is coaxial with the control shaft of the variable resistor 182. The knob 8 includes coaxially-extending two rotatable sub-knobs mechanically connected to the control shafts of the variable resistors 182 and 192 respectively. The control shafts of the variable resistors 182 and 192 move with rotations of the sub-knobs respectively.

An operation control circuit 21 connected to the speed control circuit 17 selectively activates and deactivates the speed control circuit 17 in accordance with a control signal applied to the operation control circuit 21.

A signal converting circuit 23 connected to the current sensor 22 receives an output signal from the current sensor 22 which represents the current through the drive motor 2. This circuit 23 converts the output signal from the current sensor 22 into a corresponding dc voltage signal. Accordingly, the voltage of the dc signal outputted by the circuit 23 varies as a function of the effective value of the ac current through the drive motor 2. Specifically, the signal converting circuit 23 includes a fixed resistor 231 and a capacitor 232 which are connected in parallel with the current sensor 22. The circuit 23 also includes a rectifier bridge connection 233 which is wired across the current sensor 22. The device 233 rectifies the ac output signal from the current sensor 22 and derives a dc signal corresponding to the ac signal from the sensor 22. A parallel combination of a fixed resistor 235 and a capacitor 236 is connected across the rectifier bridge connection 233 via a fixed resistor 234. The resistor 234 and the capacitor 236 smooth the dc signal derived by the rectifier bridge connection 233. The output signal of the signal converting circuit 23 appears across the capacitor 236.

An analog-to-digital (A/D) converter 24 connected to the signal converting circuit 23 changes the analog signal from the circuit 23 into a corresponding digital signal. The digital signal from the A/D converter 24 represents the effective current through the drive motor 2.

A main control circuit 25 connected to the A/D converter 24 receives the digital signal from the A/D converter 24 which represents the effective current through the drive motor 2. The main control circuit 25 generates signals which control the drive motor 2 and the feed motor 4. The control of the drive motor 2 and the feed motor 4 depends on the effective current through the drive motor 2.

The main control circuit 25 is composed of a single-chip digital microcomputer including a central processing unit (CPU), a read-only memory (ROM), a random-access memory (RAM), and an input/output (I/O) port.

A drive circuit 26 connected to the main control circuit 25 receives control signals from the main control circuit 25. The drive circuit 26 is composed of a driver integrated-circuit. The drive circuit 26 is connected to the operation control circuits 20 and 21, relay windings 27 and 28, and a motor full-speed circuit 30.

The drive circuit 26 preferably includes five drivers, such as Darlington drivers, which serve as five switches respectively. The first switch generates a signal in accordance with a first binary control signal outputted from the main control circuit 25. The signal from the first switch is applied to the operation control circuit 20. When the first binary signal assumes first and second states, the speed control circuit 16 is activated and deactivated respectively via the operation control circuit 20. The second switch generates a signal in accordance with a second binary control signal outputted from the main control circuit 25. The signal from the second switch is applied to the operation control circuit 21. When the second binary signal assumes first and second states, the speed control circuit 17 is activated and deactivated respectively via the operation control circuit 21. The third switch is connected in series with the relay winding 27 and a constant voltage source. When a third binary control signal outputted from the main control circuit 25 assumes first and second states, the third switch is closed and opened so that the relay winding 27 is energized and de-energized respectively. The fourth switch is connected in series with the relay winding 28, a switch 29, and a constant voltage source. When a fourth binary control signal outputted from the main control circuit 25 assumes first and second states, the fourth switch is closed and opened so that the relay winding 28 is energized and de-energized respectively, provided that the switch 29 remains closed. The fifth switch generates a signal in accordance with a fifth binary control signal outputted from the main control circuit 25. The signal from the fifth switch is applied to the motor full-speed circuit 30. When the fifth binary signal assumes first and second states, the motor full-speed circuit 30 is activated and deactivated respectively.

A constant dc voltage supply 32 is connected to the ac power supply via the power supply switch 10 and the automatic mode selection switch 11. The constant voltage supply 32 derives a constant potential power from the ac power outputted by the ac power supply. The constant voltage supply 32 is connected to the speed control circuits 16 and 17, the operation control circuits 20 and 21, the A/D conveter 24, the main control circuit 25, and the drive circuit 26 to power them with the constant potential.

The constant voltage supply 32 is preferably connected to the speed setting circuits 18 and 19 to supply them with the constant potential. The constant voltage supply 32 is connected to the combination of the relay winding 27 and the third switch within the drive circuit 26 to supply the combination with the constant potential. The constant voltage supply 32 is connected to the combination of the relay winding 28, the switch 29, and the fourth switch within the drive circuit 26 to supply the combination with the constant potential.

The constant voltage supply 32 includes a transformer 321, a rectifier bridge connection 322, a smoothing capacitor 323, and a voltage regulating integrated-circuit (IC) 324. A primary winding of the transformer 321 is connected across the ac power supply via the power supply switch 10 and the automatic mode selection switch 11. Accordingly, when both the switches 10 and 11 are closed, the ac power is supplied to the transformer 321. The rectifier bridge connection 322 is wired across a secondary winding of the transformer 321. The smoothing capacitor 323 is connected across the rectifier bridge connection 322. The voltage regulating IC 324 is connected to the rectifier bridge connection 322. A constant voltage appears across an output terminal of the voltage regulating IC 324.

The relay winding 28 is associated with the relay switches 28a and 28b. When the relay winding 28 is de-energized, the movable contacts of the relay switches 28a and 28b contact with the first fixed contacts and separate from the second fixed contacts of the relay switches 28a and 28b respectively. In this case, the feed motor field winding 4a and the feed motor armature winding 4b are electrically disconnected from the power supply and thus the ac current from the power supply does not flow through the feed motor windings 4a and 4b, so that the feed motor 4 stops. When the relay winding 28 is energized, the movable contacts of the relay switches 28a and 28b contact with the second fixed contacts and separate from the first fixed contacts of the relay switches 28a and 28b respectively. In this case, provided that the power supply switch 10 and the automatic mode selection switch 11 are closed, the feed motor field winding 4a and the feed motor armature winding 4b are electrically connected to the power supply via the Triac 15 and thus the ac current from the power supply flows through the feed motor windings 4a and 4b so that the feed motor 4 rotates. Since the effective ac current passing through the feed motor 4 is adjustable via the Triac 15, the rotational speed of the feed motor 4 is controllable via the Triac 15.

The relay winding 27 is associated with the relay switches 27a and 27b. When the relay winding 27 is de-energized, the movable contacts of the relay switches 27a and 27b contact with the first fixed contacts and separate from the second fixed contacts of the relay switches 27a and 27b respectively. When the relay winding 27 is energized, the movable contacts of the relay switches 27a and 27b contact with the second fixed contacts and separate from the first fixed contacts of the relay switches 27a and 27b respectively. The connection of the feed motor armature winding 4b to the power supply is reversed in accordance with whether the relay winding 27 is energized or de-energized. Accordingly, the direction of rotation of the feed motor 4 depends on whether the relay winding 27 is energized or de-energized, so that the drill unit 3 (see FIG. 1) is selectively lowered or lifted in accordance with whether the relay winding 27 is energized or de-energized. Specifically, when the relay winding 27 is de-energized, the feed motor 4 rotates in the direction of lowering the drill unit 3. When the relay winding 27 is energized, the feed motor 4 rotates in the direction of lifting the drill unit 3.

The motor full-speed circuit 30 includes an optical coupler 302 and fixed resistors 301 and 303. A light-emitting diode within the optical coupler 302, the fixed resistor 301, and the fifth switch within the drive circuit 26 are connected in series with the constant voltage source. When the fifth switch within the drive circuit 26 is closed and opened, the optical coupler 302 is energized and de-energized respectively. One terminal of a bidirectional semiconductor switch within the optical coupler 302 is connected via the fixed resistor 303 to the junction between the relay switch 28b and the Triac 15. The other terminal of the bidirectional switch within the optical coupler is connected to the gate of the Triac 15. When the optical coupler 302 is energized, the optical coupler 302 supplies the gate of the Triac 15 with a signal which maximizes the conduction or firing angle of the Triac 15 and thereby maximizes the speed of the feed motor 4 independent of the control signal applied to the gate of the Triac 15 from the speed control circuit 17. When the optical coupler 302 is de-energized, the optical coupler 302 essentially separates from the gate of the Triac 15 so that the control signal applied to the gate of the Triac 15 from the speed control circuit 17 directly determines the conduction or firing angle of the Triac 15 and in turn determines the speed of the feed motor 4.

The switch 29 is of the limit type, being mounted on the drill stand 1 (see FIG. 1). A control arm of the switch 29 is engageable with a portion of the drill unit 3 or a member fixed to the drill unit 3. When the drill unit 3 is lifted to a preset position, the portion of the drill unit 3 or the member fixed to the drill unit 3 encounters the control arm of the switch 29 so that the switch 29 is opened. When the switch 29 is opened, the relay winding 28 is de-energized independent of the fourth switch within the drive circuit 26 so that the feed motor 4 is forcedly stopped. When the drill unit 3 remains below the preset position, the switch 29 remains closed so that the feed motor 4 is directly controlled via the main control circuit 25. In this way, the switch 29 determines the upper limit position of the drill unit 3.

In operation, the drill bit 9 is attached to the main spindle of the drill unit 3. Then, the knob 8 is handled so that setting rotational speeds of the drive motor 2 and the feed motor 4 can match the diameter of the drill bit 9. After the setting rotational speeds of the motors 2 and 4 are determined, the knob 7 is handled to close the power supply switch 10. When the power supply switch 10 is closed, the electromagnetic winding 13 of the electromagnet is energized so that a workpiece of magnetic material is fixed to the electromagnetic base 6. Then, the knob 7 is further handled to close the automatic mode selection switch 11. When the automatic mode selection switch 11 is closed, the main control circuit 25 and the other electric circuits are powered.

Figure 3:
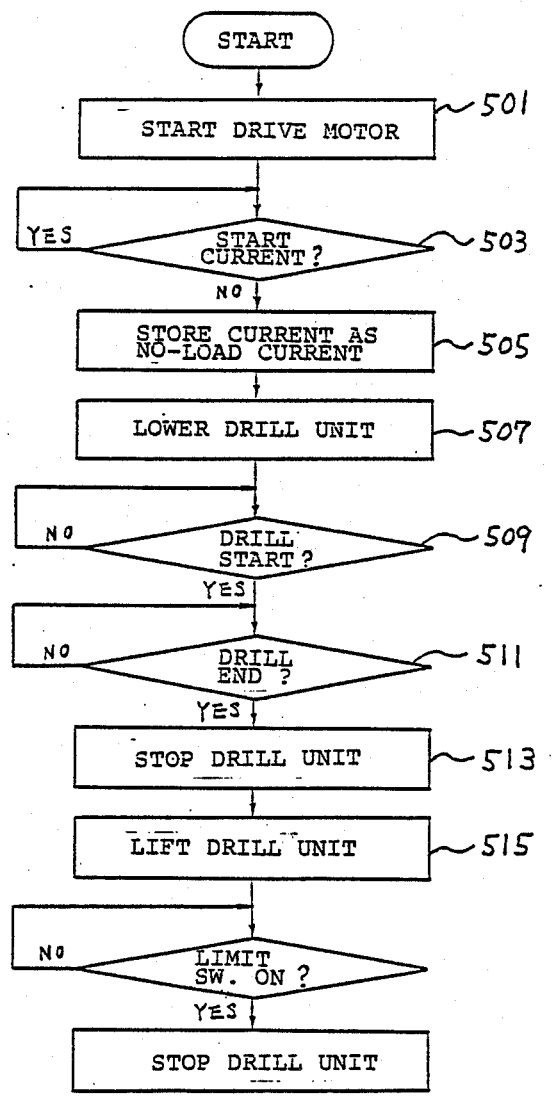
FIG. 3 is a flowchart of a program for operating the main control circuit of FIG. 2.

The main control circuit 25 operates in accordance with a program stored in the ROM within the circuit 25. When the main control circuit 25 is powered, the program starts. FIG. 3 is a flowchart of the program.

A first step of the program initializes variables and flags used in subsequent steps in the program. After the first step, the program advances to a step 501.

As shown in FIG. 3, the step 501 outputs an activation signal to the operation control circuit 20 via the drive circuit 26 so that the circuit 20 activates the speed control circuit 16. The activation of the speed control circuit 16 allows the drive motor 2 to rotate at essentially the setting value. After the step 501, the program advances to a step 503.

The step 503 derives the present effective current through the drive motor 2 from the signal outputted by the A/D converter 24. Then, the step 503 determines whether or not the current through the drive motor 2 is exposed to starting conditions. When the current is exposed to the starting conditions, the step 503 is repeated. When the current is not exposed to the starting conditions, the program advances to a step 505.

Specifically, after the step 503 derives the present effective current through the drive motor 2, the step 503 calculates the difference between the present current and the preceding current through the drive motor 2. The preceding current means the effective current through the drive motor 2 which was derived during the preceding execution of the step 503. In the case of the first execution of the step 503, the difference between the present current and a reference initial value is calculated. Then, the step 503 determines whether or not the current difference exceeds a preset reference value. When the current difference exceeds the reference value, that is, when the effective current through the drive motor 2 is varying at an appreciable rate, the program executes a preset time delay and then the step 503 is repeated. When the current difference does not exceed the reference value, that is, when the effective current through the drive motor 2 is essentially constant, the program advances to the step 505.

Figure 4:
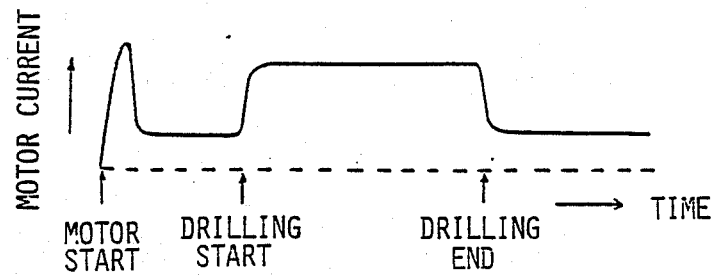
FIG. 4 is a diagram showing variations in the effective current passing through the drive motor of FIGS. 1 and 2.

As shown in FIG. 4, during a start of the drive motor 2, the effective current passing through the drive motor 2 varies at appreciable rates. Accordingly, the detection of variations in the current through the drive motor 2 allows a determination as to whether or not the current through the drive motor 2 is exposed to starting conditions.

Since a varying starting current flowing through the drive motor 2 generally lasts for a certain time interval from the moment of the start of the drive motor 2, the step 503 may merely execute a time delay matching this certain time interval.

The step 505 stores or holds a value of the present effective current through the drive motor 2 as an indication of a no-load current. It should be noted that the value of the no-load current is held by the RAM within the main control circuit 25.

A step 507 following the step 505 de-energizes the relay winding 27 via the drive circuit 26 so that the feed motor 4 rotates in the direction of lowering the drill unit 3. The step 507 also energizes the relay winding 28 via the drive circuit 26. The energization of the relay winding 28 allows the feed motor 4 to start. In addition, the step 507 outputs an activation signal to the operation control circuit 21 so that the circuit 21 activates the speed control circuit 17. The activation of the speed control circuit 17 allows the feed motor 4 to rotate at essentially the setting value. After the step 507, the program advances to a step 509.

When the drill unit 3 is lowered, the drill bit 9 meets the workpiece and thus the drilling process starts. As shown in FIG. 4, upon a start of the drilling process, the effective current through the drive motor 2 increases abruptly.

The step 509 determines whether or not the drilling process has started by detecting an abrupt increase in the effective current passing through the drive motor 2. When the drilling process has not yet started, the step 509 is repeated. When the drilling process has started, the program advances to a step 511.

Specifically, the step 509 derives the present effective current through the drive motor 2 from the signal outputted by the A/D converter 24. Then, the step 509 calculates the difference between the present current and the no-load current through the drive motor 2. In addition, the step 509 determines whether or not the current difference exceeds a preset reference value. When the current difference exceeds the reference value, that is, when the effective current through the drive motor 2 is increasing, the program advances to the step 511. When the current difference does not exceed the reference value, that is, when the effective current through the drive motor 2 is not increasing, the step 509 is repeated.

As shown in FIG. 4, upon an end of the drilling process, the effective current through the drive motor 2 decreases abruptly to a no-load level.

The step 511 determines whether or not the drilling process has ended on the basis of a comparison between the present effective current and the no-load current through the drive motor 2. When the drilling process has not yet ended, the step 511 is repeated. When the drilling process has ended, the program advances to a step 513.

Specifically, the step 511 derives the present effective current through the drive motor 2 from the signal outputted by the A/D converter 24. Then, the step 511 calculates the difference between the present current and the no-load current through the drive motor 2. In addition, the step 511 determines whether or not the current difference exceeds a preset reference value. When the current difference exceeds the reference value, that is, when the present current appreciably differs from the no-load current, the step 511 is repeated. When the present current essentially equals the no-load current, the program advances to the step 513.

The step 513 outputs a deactivation signal to the operation control circuit 20 via the drive circuit 26 so that the circuit 20 deactivates the speed control circuit 16. The step 513 also de-energizes the relay winding 28 via the drive circuit 26 so that the feed motor 4 stops.

A step 515 following the step 513 energizes the relay winding 27 via the drive circuit 26 so that the feed motor 4 can rotate in the direction of lifting the drill unit 3. Then, the step 515 energizes the relay winding 28 via the drive circuit 26 so that feed motor 4 rotates. In addition, the step 515 activates the motor full-speed circuit 30 via the drive circuit 26 so that the speed of the feed motor 4 is maximized. As a result, the drill unit 3 is lifted at its maximal speed. After the step 515, the program ends.

When the drill unit 3 reaches the upper limit position, the switch 29 is activated and thereby the relay winding 28 is de-energized. The de-energization of the relay winding 28 stops the feed motor 4 so that the drill unit 3 halts at the upper limit position.

DESCRIPTION OF THE SECOND PREFERRED EMBODIMENT

Figure 5:
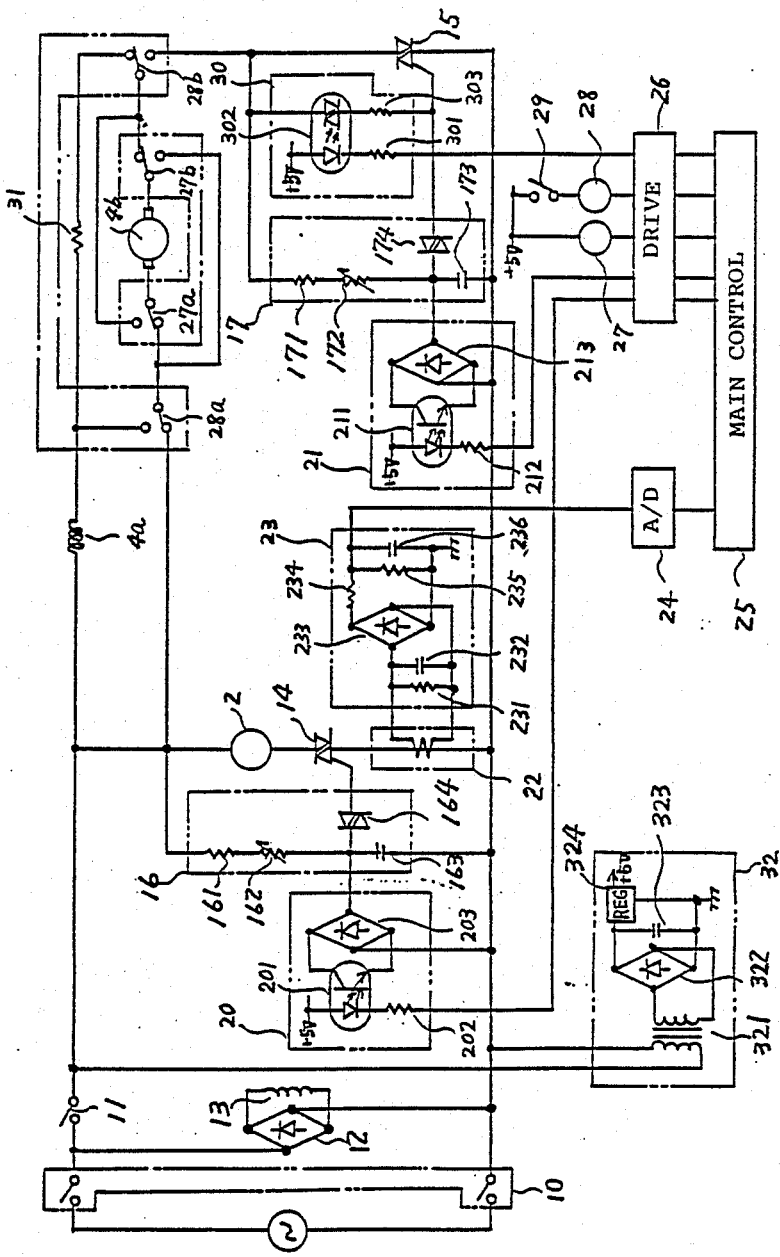
FIG. 5 is a diagram of an electric part of a drilling machine according to a second embodiment of this invention.

FIG. 5 shows a second embodiment of this invention which is similar to the embodiment of FIGS. 1–4 except for design changes described hereinafter.

A speed control circuit 16 is composed of an open-loop type phase control circuit including a fixed resistor 161, a variable resistor 162, a capacitor 163, and a Diac 164. The variable resistor 162 is mechanically connected to the knob 8 (see FIG. 1) so that the resistance of the resistor 162 depends on the position of the knob 8. One terminal of the variable resistor 162 is electrically connected via the fixed resistor 161 to the junction between the drive motor 2 and the automatic mode selection switch 11 leading to a first terminal of the power supply. The other terminal of the variable resistor 162 is electrically connected to one terminal of the capacitor 163 and also to one terminal of the Diac 164. The other terminal of the capacitor 163 is connected to the power supply switch 10 leading to a second terminal of the power supply. The other terminal of the Diac 164 is connected to the gate of the Triac 14. The resistors 161 and 162, and the capacitor 163 produce a time delay which varies as a function of the resistance of the variable resistor 162.

An operation control circuit 20 includes an optical coupler 201, a fixed resistor 202, and a rectifier bridge connection 203. A light-emitting diode within the optical coupler 201, the fixed resistor 202, and the first switch within the drive circuit 26 are connected in series with a constant dc voltage source, such as the constant dc voltage supply 32. A phototransistor within the optical coupler 201 is connected across the rectifier bridge connection 203. The rectifier bridge connection 203 is wired across the capacitor 163 within the speed control circuit 16. When the first switch within the drive circuit 26 is closed, the optical coupler 201 is energized so that the capacitor 163 is short-circuited via the rectifier bridge connection 203. When the first switch within the drive circuit 26 is opened, the optical coupler 201 is de-energized so that the short circuit of the capacitor 163 is suspended. The speed control circuit 16 is deactivated and activated in accordance with whether or not the capacitor 163 is short-circuited.

As is understood from the previous description, the speed control circuit 16 of this embodiment serves as the combination of the speed control circuit 16 and the speed setting circuit 18 of the embodiment of FIGS. 1-4.

A speed control circuit 17 is composed of an open-loop type phase control circuit including a fixed resistor 171, a variable resistor 172, a capacitor 173, and a Diac 174. The variable resistor 172 is mechanically connected to the knob 8 (see FIG. 1) so that the resistance of the resistor 172 depends on the position of the knob 8. One terminal of the variable resistor 172 is electrically connected via the fixed resistor 171 to the junction between the Triac 15 and the relay switch 28b leading to a first terminal of the power supply. The other terminal of the variable resistor 172 is electrically connected to one terminal of the capacitor 173 and also to one terminal of the Diac 174. The other terminal of the capacitor 173 is connected to the power supply switch 10 leading to a second terminal of the power supply. The other terminal of the Diac 174 is connected to the gate of the Triac 15. The resistors 171 and 172, and the capacitor 173 produce a time delay which varies as a function of the resistance of the variable resistor 172.

An operation control circuit 21 includes an optical coupler 211, a fixed resistor 212, and a rectifier bridge connection 213. A light-emitting diode within the optical coupler 211, the fixed resistor 212, and the second switch within the drive circuit 26 are connected in series with a constant dc voltage source, such as the constant dc voltage supply 32. A phototransistor within the optical coupler 211 is connected across the rectifier bridge connection 213. The rectifier bridge connection 213 is wired across the capacitor 173 within the speed control circuit 17. When the second switch within the drive circuit 25 is closed, the optical coupler 211 is energized so that the capacitor 173 is short-circuited via the rectifier bridge connection 213. When the second switch within the drive circuit 25 is opened, the optical coupler 211 is de-energized so that the short circuit of the capacitor 173 is suspended. The speed control circuit 17 is deactivated and activated in accordance with whether or not the capacitor 173 is short-circuited.

As is understood from the previous description, the speed control circuit 17 of this embodiment serves as the combination of the speed control circuit 17 and the speed setting circuit 19 of the embodiment of FIGS. 1-4.

The program for operating the main control circuit 25 is modified as follows.

Figure 6:
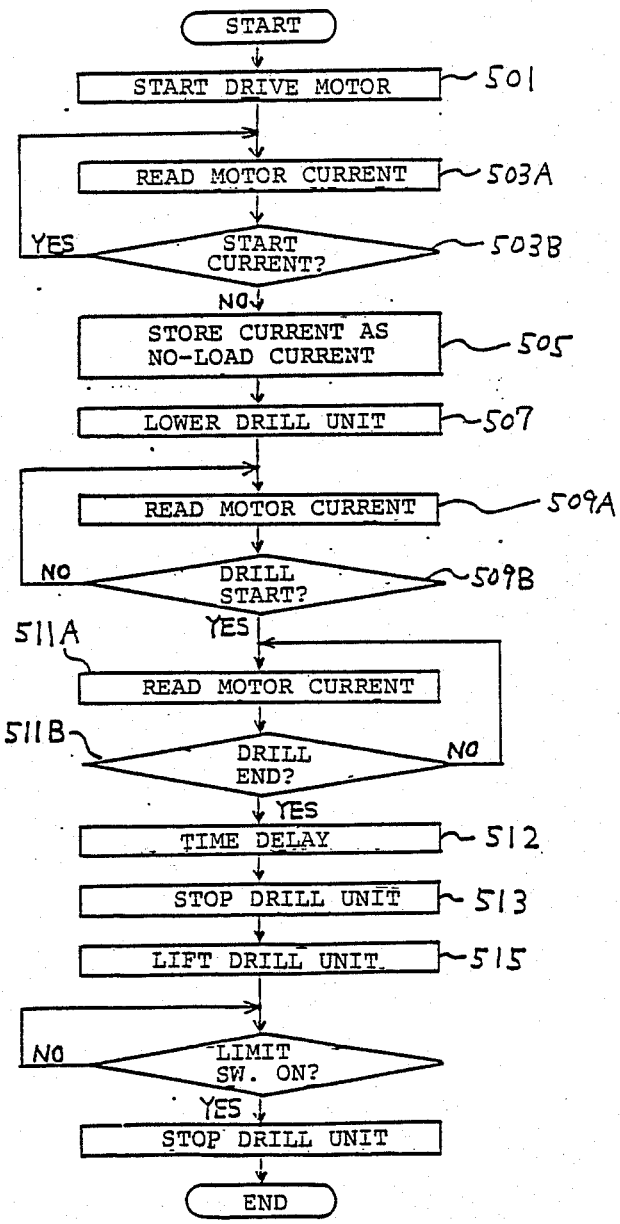
FIG. 6 is a flowchart of a program for operating the main control circuit, of FIG. 5.

As shown in FIG. 6, the step 503 of FIG. 3 is divided into steps 503A and 503B. The step 503A follows the step 501. The step 503A derives the present effective current through the drive motor 2 from the signal outputted by the A/D converter 24. After the step 503A, the program advances to the step 503B.

The step 503B determines whether or not the current through the drive motor 2 is exposed to starting conditions. When the current is exposed to the starting conditions, the program returns to the step 503A. When the current is not exposed to the starting conditions, the program advances to a step 505.

Specifically, the step 503B calculates the difference between the present current and the preceding current through the drive motor 2. The preceding current means the effective current through the drive motor 2 which was derived during the preceding execution of the step 503B. In the case of the first execution of the step 503B, the difference between the present current and a reference initial value is calculated. Then, the step 503B determines whether or not the current difference exceeds a preset reference value. When the current difference exceeds the reference value, that is, when the effective current through the drive motor 2 is varying at an appreciable rate, the program executes a preset time delay and then returns to the step 503A. When the current difference does not exceed the reference value, that is, when the effective current through the drive motor 2 is essentially constant, the program advances to the step 505.

The step 509 of FIG. 3 is divided into steps 509A and 509B. The 509A follows the step 507. The step 509A derives the present effective current through the drive motor 2 from the signal outputted by the A/D converter 24. After the step 509A, the program advances to the step 509B.

The step 509B determines whether or not the drilling process starts. Specifically, the step 509B calculates the difference between the present current and the no-load current through the drive motor 2. In addition, the step 509B determines whether or not the current difference exceeds a preset reference value. When the current difference exceeds the reference value, that is, when the effective current through the drive motor 2 is increasing, the program advances to a step 511A. When the current difference does not exceed the reference value, that is, when the effective current through the drive motor 2 is not increasing, the program returns to the step 509A.

The step 511 of FIG. 3 is divided into steps 511A and 511B. The step 511A follows the step 509B. The step 511A derives the present effective current through the drive motor 2 from the signal outputted by the A/D converter 24. After the step 511A, the program advances to the step 511B.

The step 511B calculates the difference between the present current and the no-load current through the drive motor 2. In addition, the step 511B determines whether or not the current difference exceeds a preset reference value. When the current difference exceeds the reference value, that is, when the present current appreciably differs from the no-load current, the program returns to the step 511A. When the present current essentially equals the no-load current, the program advances to a step 512.

The step 512 is added between the steps 511B and 513. The step 512 produces a preset time delay. In other words, the program stays in the step 512 for a preset time interval. Accordingly, the program advances to the step 513 at a moment which follows the moment of the movement of the program from the step 511B by the preset time interval.

The step 512 allows the drill unit 3 to remain lowered for the preset time interval from the moment at which the end or completion of the drilling process is detected.

Near the completion of the drilling process, remaining tin lower walls of the workpiece immediately below the drilled hole are sometimes deformed and projected downward. In such cases, the effective current through the drive motor 2 can drop essentially to a no-load level. In this embodiment, since the drill unit 3 remains lowered for the preset time interval after a drop in the effective current through the drive motor 2 to the no-load level is detected, the projected thin walls of the workpiece can be removed fully and thus the drilling process can be completed reliably.

DESCRIPTION OF THE THIRD PREFERRED EMBODIMENT

A third embodiment of this invention is similar to the embodiment of FIGS. 5 and 6 except for design changes described hereinafter.

Figure 7A:
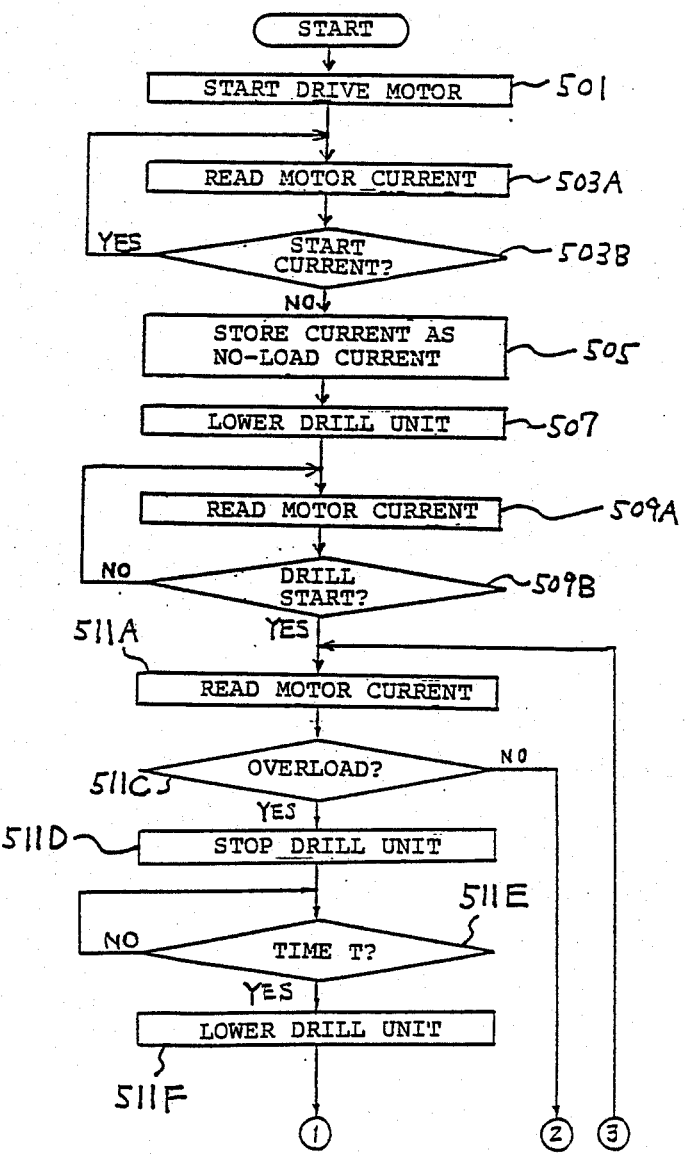
FIGS. 7(A) and 7(B) together are a flowchart of a program for operating a main control circuit in a third embodiment of this invention.
Figure 7B:
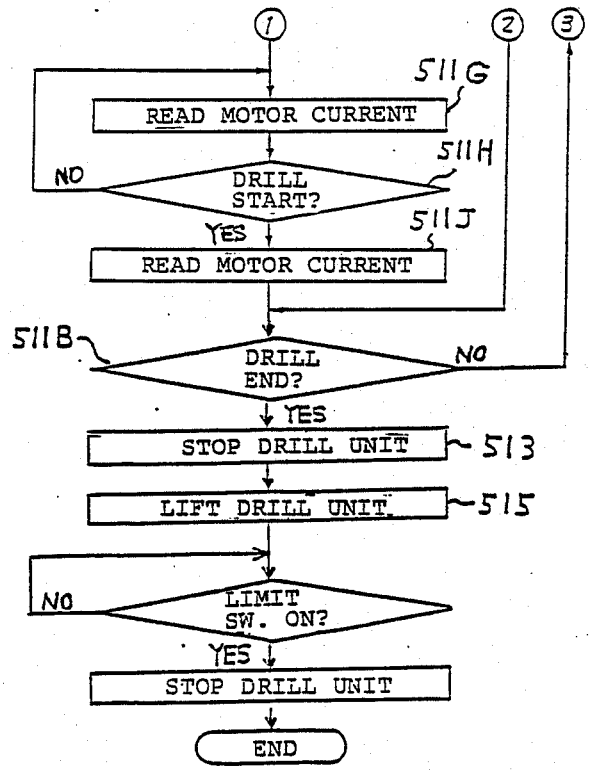

The program for operating the main control circuit 25 shown in FIG. 6 is modified to a program of FIGS. 7(A) and 7(B). As shown in FIGS. 7(A) and 7(B), several steps are added between the steps 511A and 511B. After the step 511A, the program advances to a step 511C.

The step 511C determines whether or not the drive motor 2 is being overloaded. When the drive motor 2 is being overloaded, the program advances to a step 511D. When the drive motor 2 is not being overloaded, the program jumps to the step 511B. Specifically, the step 511C compares the present effective current through the drive motor 2 with a preset reference value representative of overload. When the present current through the drive motor 2 exceeds the reference value, the program advances to the step 511D. When the present current through the drive motor 2 does not exceed the reference value, the program jumps to the step 511B.

The step 511D de-energizes the relay winding 28 via the drive circuit 26 so that the feed motor 4 stops. The step 511D also sets a timer within the main control circuit 25. After the step 511D, the program advances to a step 511E.

The step 511E determines whether or not the time elapsed since the stop of the feed motor 4 is longer than a reference time interval T by comparing the output of the timer with a preset value corresponding to the reference time interval T. When the time elapsed since the stop of the feed motor 4 is equal to or shorter than the reference time interval T, the step 511E is repreated. When this time elapsed is longer than the reference time interval T, the program advances to a step 511F.

The step 511F energizes the relay winding 28 via the drive circuit 26 so that the feed motor 4 restarts and lowers the drill unit 3 (see FIG. 1). After the step 511F, the program advances to a step 511G.

The step 511G derives the present effective current through the drive motor 2 as in the step 509A. After the step 511G, the program advances to a step 511H.

The step 511H determines whether or not the drilling process has started as in the step 509B. When the drilling process has not yet started, the program returns to the step 511G. When the drilling process has started, the program advances to a step 511J.

The step 511J derives the present effective current through the drive motor 2 as in the step 509A. After the step 511J, the program advances to the step 511B.

As shown in FIG. 7(B), the time delay step 512 (see FIG. 6) may be omitted.

Figure 8:
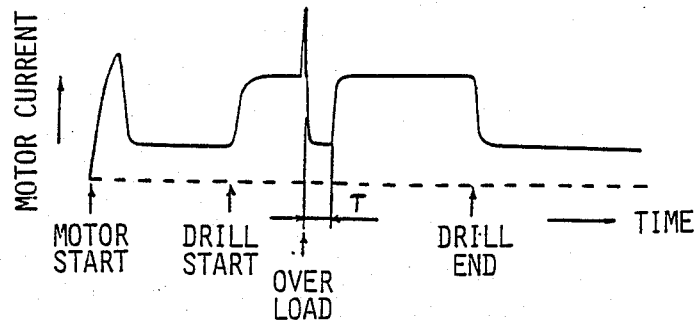
FIG. 8 is a diagram showing variations in the effective current passing through a drive motor in the third embodiment.

During a drilling process, swarf sometimes causes an overload of the drive motor 2. As shown in FIG. 8, during a drilling process, when the drive motor 2 is overloaded, the effective current passing through the drive motor 2 increases abruptly. The step 511C detects the overload of the drive motor 2 by sensing an increase in the effective current through the drive motor 2. When the overload of the drive motor 2 is detected by the step 511C, the step 511D stops the feed motor 4 so that the load on the drive motor 2 decreases and thus the effective current through the drive motor 2 drops as shown in FIG. 8. The step 511E continues the stop of the feed motor 4 for the time interval T. During this time interval T, the drive motor 2 remains rotating under a small load so that the swarf can be removed. After the time interval elapses, the step 511F restarts the feed motor 4 and thereby the drill bit 9 (see FIG. 1) engages the workpiece again so that the effective current through the drive motor 2 increases as shown in FIG. 8.

The step 511E may count pulses which are outputted by a tachogenerator or tachometer in synchronism or in accordance with rotation of the drive motor 2. In this case, after the feed motor 4 is stopped by the step 511D, the step 511E starts to count the pulses. When the number of the counted pulses reaches a preset number, the program advances to the step 511F.

DESCRIPTION OF THE FOURTH PREFERRED EMBODIMENT

Figure 9:
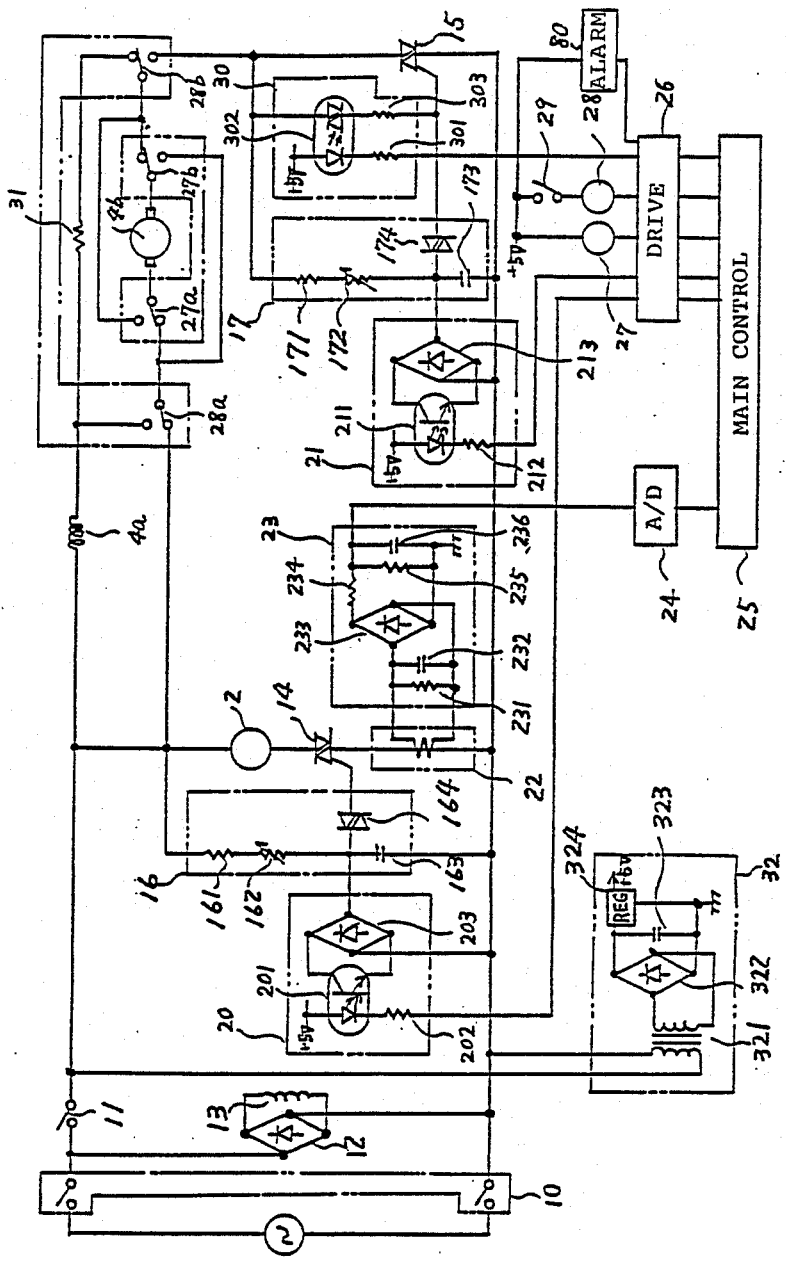
FIG. 9 is a diagram of an electric part of a drilling machine according to a fourth embodiment of this invention.

FIG. 9 shows a fourth embodiment of this invention which is similar to the embodiment of FIGS. 5 and 6 except for design changes described hereinafter.

As shown in FIG. 9, this embodiment includes an audible or visual alarm 80. The drive circuit 26 includes a driver, such as a Darlington driver, serving as a sixth switch controllable via a signal outputted by the main control circuit 25. The alarm 80 and the sixth switch within the driver circuit 26 are connected in series with a dc voltage source such as the constant voltage supply 32. When the main control circuit 25 outputs an activation signal to the sixth switch within the drive circuit 26, the sixth switch is closed so that the alarm 80 is activated. When the main control circuit 25 outputs a deactivation signal to the sixth switch within the drive circuit 26, the sixth switch is opened so that the alarm 80 is deactivated.

Figure 10A:
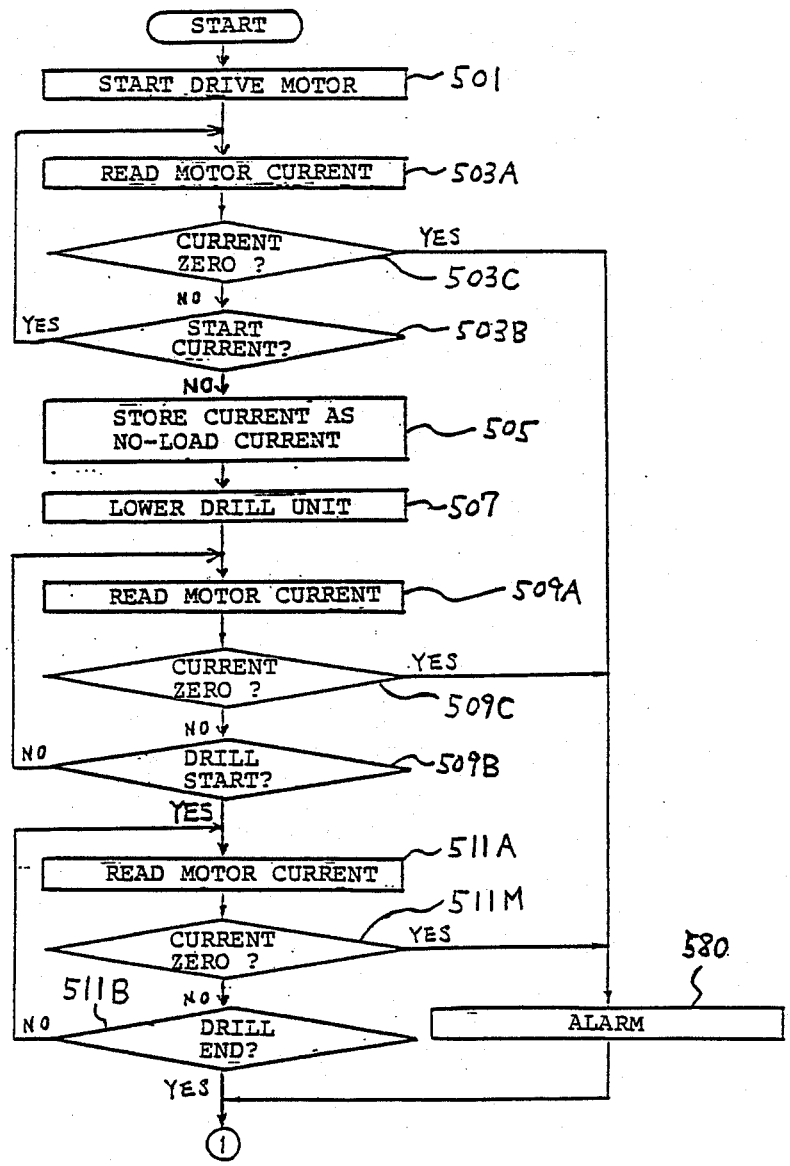
FIGS. 10(A) and 10(B) together are a flowchart of a program for operating the main control unit of FIG. 9.
Figure 10B:
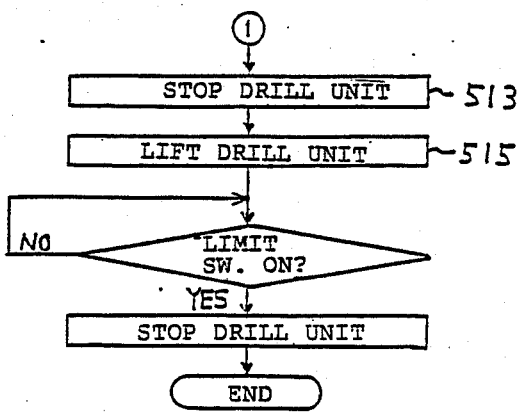

The program for operating the main control circuit 25 shown in FIG. 6 is modified to a program of FIGS. 10(A) and 10(B).

As shown in FIG. 10(A), a step 503C is added between the steps 503A and 503B. After the step 503A, the program advances to the step 503C. The step 503C determines whether or not the present effective current through the drive motor 2 is zero. When the present current through the drive motor 2 is zero, the program advances to a step 580. When the present current through the drive motor 2 is not zero, the program advances to the step 503B.

A step 509C is added between the steps 509A and 509B. After the step 509A, the program advances to the step 509C. The step 509C determines whether or not the present effective current through the drive motor 2 is zero. When the present current through the drive motor 2 is zero, the program advances to the step 580. When the present current through the drive motor 2 is not zero, the program advances to the step 509B.

A step 511M is added between the steps 511A and 511B. After the step 511A, the program advances to the present effective current through the drive motor 2 is zero. When the present current through the drive motor 2 is zero, the program advances to the step 580. When the present current through the drive motor 2 is not zero, the program advances to the step 511B.

The step 580 outputs an activation signal to the sixth switch within the drive circuit 26 so that the alarm 80 is activated. After the step 580, the program advances to the step 513.

As shown in FIG. 10(B), the time delay step 512 (see FIG. 6) may be omitted.

It is assumed that during activation of the drive motor 2 to perform the drilling process, a malfunction, such as a breaking of a winding within the drive motor 2 or a malfunction of the circuits for controlling the drive motor 2, occurs and thus the effective current passing through the drive motor 2 drops to zero.

This malfunction is detected by the steps 503C, 509C, and 511M. When the malfunction is detected, the alarm 80 is activated by the step 580 and the feed motor 4 is stopped by the step 513. In this way, the alarm 80 warns that a malfunction relating to the drive motor 2 occurs. When such a malfunction occurs, the drill unit 3 (see FIG. 1) is stopped. Accordingly, in the event of such a malfunction, the drill bit 9 (see FIG. 1), the mechanism sliding the drill unit 3 (see FIG. 1), and the body of the drilling machine (see FIG. 1) are prevented from causing damage.

What is claimed is:
1. A drilling machine comprising:
(a) a drill bit;
(b) a drive motor connected to the drill bit for actuating the drill bit;
(c) means for supplying electric current to the drive motor to activate the drive motor;
(d) means for feeding the drill bit with respect to a workpiece;
(e) means for sensing the current supplied to the drive motor;
(f) means for storing a value of the current which is sensed when the drill bit is out of engagement with the workpiece; and
(g) means for detecting whether or not a drilling process is completed in accordance with a value of the present sensed current and with the stored value of the sensed current.

2. The drilling machine of claim 1 wherein the detecting means is operative to detect whether or not a drilling process is completed in accordance with a comparison between a value of the present sensed current and the stored value of the sensed current.

3. The drilling machine of claim 1 further comprising means for deactivating the feeding means when the drilling process is completed.

4. The drilling machine of claim 1 further comprising means for deactivating the feeding means a preset time after the drilling process is completed.

5. The drilling machine of claim 1 further comprising means for determining whether or not the sensed current becomes zero, and means for deactivating the feeding means when the sensed current becomes zero.

6. The drilling machine of claim 1 further comprising means for determining whether or not the sensed current becomes zero, and means for alarming when the sensed current becomes zero.

7. The drilling machine of claim 1 further comprising means for detecting an overload of the drive motor, and means for deactivating the feeding means when the overload of the drive motor is detected.

8. The drilling machine of claim 7 further comprising means for activating the feeding means a preset time after the feeding means is deactivated.

9. The drilling machine of claim 7 wherein the overload of the drive motor is detected in accordance with the sensed current supplied to the drive motor.

10. A drilling machine comprising:
(a) a drill bit;
(b) a drive motor connected to the drill bit for actuating the drill bit;
(c) means for supplying electric current to the drive motor to activate the drive motor;
(d) means for feeding the drill bit with respect to a workpiece;
(e) means for sensing the current supplied to the drive motor;
(f) means for detecting a completion of a drilling process in accordance with the sensed current; and
(g) means for maintaining activation of the feeding means for a preset time from a moment at which the completion of the drilling process is detected.

11. A drilling machine comprising:
(a) a drill bit;
(b) a drive motor connected to the drill bit for actuating the drill bit;
(c) means for feeding the drill bit with respect to a workpiece;
(d) means for sensing an overload of the drive motor;
(e) means for deactivating the feeding means when the overload of the drive motor is sensed; and
(f) means for activating the feeding means a preset time after the feeding means is deactivated.

12. A drilling machine comprising:
(a) a drill bit;
(b) a drive motor connected to the drill bit for actuating the drill bit;
(c) means for supplying electric current to the drive motor to activate the drive motor;

(d) means for feeding the drill bit with respect to a workpiece;

(e) means for sensing the current supplied to the drive motor;

(f) means for determining whether or not the sensed current supplied to the drive motor becomes zero; and (g) means for deactivating the feeding means when the sensed current becomes zero.

13. The drilling machine of claim 12 further comprising means for alarming when the sensed current becomes zero.

* * * * *